United States Patent [19]

Kraus

[11] Patent Number: 4,911,030
[45] Date of Patent: Mar. 27, 1990

[54] TRACTION ROLLER TRANSMISSION RATIO CONTROL ARRANGEMENT

[75] Inventor: Charles E. Kraus, Austin, Tex.

[73] Assignee: Excelermatic Inc., Austin, Tex.

[21] Appl. No.: 303,936

[22] Filed: Jan. 30, 1989

[51] Int. Cl.[4] ............................................. F16H 15/38
[52] U.S. Cl. ..................................... 74/200; 74/190.5; 74/208
[58] Field of Search ..................... 74/190.5, 200, 208

[56] References Cited

U.S. PATENT DOCUMENTS

| | | | |
|---|---|---|---|
| 4,355,547 | 10/1982 | Poole et al. | 74/200 X |
| 4,434,675 | 3/1984 | Kraus | 74/200 |
| 4,526,051 | 7/1985 | Kraus | 74/200 |
| 4,718,294 | 1/1988 | Okoshi | 74/200 X |
| 4,744,032 | 5/1988 | Miyaura et al. | 74/200 X |
| 4,846,008 | 7/1989 | Kraus | 74/206 X |

Primary Examiner—Allan D. Herrmann

[57] ABSTRACT

In an infinitely variable transmission wherein two toric traction discs are rotatably supported in a housing opposite one another so as to define therebetween a toric cavity in which at least two motion transmitting traction rollers are disposed in engagement with the toric discs and supported by pivot trunnions, each pivot trunnion is provided with a single support roller disposed on a track section and has an axial control end which is supported so as to be slightly movable in a plane normal to the axis of the toric discs and hydraulic control means are provided for controllably moving the trunnion control ends for initiation of a transmission ratio change and a feedback structure is further associated with the trunnion ends and with the hydraulic control means for terminating ratio changing tilting of the trunnions when the necessary transmission ratio change has been executed.

7 Claims, 4 Drawing Sheets

TRACTION ROLLER TRANSMISSION RATIO CONTROL ARRANGEMENT

BACKGROUND OF THE INVENTION

The invention relates to a control arrangement for infinitely variable traction roller transmissions in which power is transmitted through pivotally supported traction rollers whose transmission ratio determining pivot position may be varied by hydraulic mechanisms.

The forces required for th engagement of the various traction surfaces are generally very large and are therefore supplied in many cases by high pressure fluid systems. However, such high pressure fluid systems are expensive and furthermore subject to frequent leakages since the seal rings needed in the high pressure system are subjected to high loads.

Mechanical operating mechanisms have therefore been utilized but naturally while such mechanical operating mechanisms are good for smaller transmissions they are generally not satisfactory for larger power transmissions. A good mechanical transimssion ratio control arrangement is for example shown in applicant's U.S. application Ser. No. 259,043 of Oct. 17, 1988 entitled "Infinitely Variable Traction Roller Transmission". This arrangement is also simple and inexpensive but for high power transmissions and automatic ratio change as it is, for example, required for automotive applications, a purely mechanical arrangement is not adequate.

It is therefore the principal object of the present invention to provide a control system for a traction roller transmission of the type disclosed in U.S. application Ser. No. 259,043 which is suitable for high power transmission requirements but which is relatively simple and without the operating problems caused by high pressure hydraulic pumps and operating mechanisms.

SUMMARY OF THE INVENTION

This is achieved by providing in an infinitely variable transmission which has two toric traction discs rotatably supported in a housing opposite one another so as to define therebetween a toric cavity in which at least two motion transmitting traction rollers are disposed in radial symmetry in engagement with the toric discs and supported by pivot trunnions on a single support roller for each trunnion which support roller is received in a partial circular track section mounted in the housing for forcing the trunnion and the associated traction roller into firm engagement with the toric discs for permitting transmission of motion therebetween wherein an axially projecting control end of each trunnion is supported so as to be slightly movable in a plane normal to the axis of the toric discs, hydraulic means associated with the trunnion ends for tilting the trunnions in said plane for the initiation of a transmission ratio change, and a feedback structure also associated with the trunnion ends and with the hydraulic control means for terminating ratio changing tilting of the trunnions when the necessary transmission ratio change has been executed.

The traction roller support trunnions are hydraulically supported preferably by hydraulically operated wedges which force the traction rollers in engagement with the toric discs with a force corresponding to the hydraulic operating forces but multiplied by the wedge structure.

With this arrangement hydraulic ratio control and roller engagement force control is achieved with the aid of a relatively low pressure fluid utilizing also a single relatively low pressure for the fluids in all applications thereby requiring only a single low pressure pump and only low pressure seals.

SHORT DESCRIPTION OF THE DRAWINGS

FIG. 1 shows the transmission in cross-section with the cylinder and piston arrangement for the generation of contact forces;

DESCRIPTION OF A PREFERRED EMBODIMENT

Figure 2:
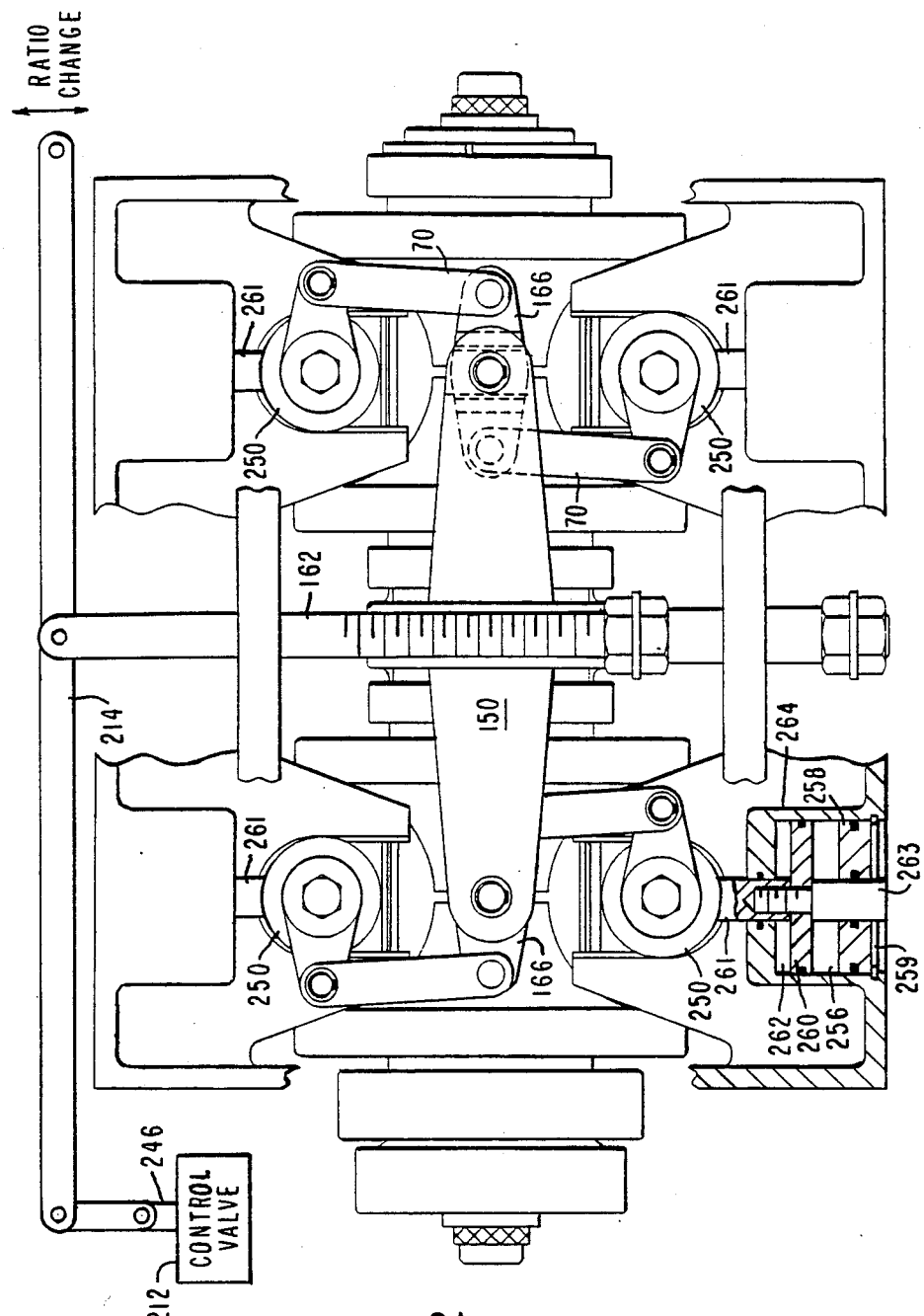
FIG. 2 shows the transmission ratio control and feedback arrangement.

The present invention generally relates to a traction roller transimssion of the type disclosed in applicant's U.S. application Ser. No. 259,043 of Oct. 17, 1988, the content of which is incorporated herein by reference. The arrangement as shown in FIG. 1 of the present application utilizes a twin traction roller structure for relatively high-power transmission and in order to avoid the need for heavy and expensive axial thrust bearings for the toric discs. In the arrangement shown in FIG. 1 only the structure necessary for an understanding of the particular embodiment will be described: The two outer toric discs 102 and 104 are firmly mounted on the main transmission shaft 106 by way of mounting sleeves 108 and 110, the sleeve 108 being provided with a gear structure 174 to be driven thereby. The inner discs 112 and 114 are mounted on a hollow transmission shaft 116 through which the main transmission shaft 106 extends and which carries an output gear 118, the hollow transmission shaft 116 being supported by bearings 120. The metal track members 122 for the traction roller support trunnion rollers 123 are provided with an adjustable backup structure including a wedge 124 disposed on an inclined backup plate 126 and including needle bearing structures 128 to facilitate wedging movement. Pistons 130 disposed in cylinders 132 abut the wedges for hydraulic operation of the wedges so as to provide the required contact forces between the traction rollers 134 and the discs 102, 104 and 112, 114. In this manner the hydraulic fluid pressure necessary for operating the pistons 130 is only relatively low which eliminates the need for high pressure fluid pumps and high pressure piston seals. Also jerky motions are not directly applied to the pistons.

As shown in FIG. 2, the feedback structure is essentially the same as the transmission ratio control arrangement shown in FIG. 5 of U.S. application Ser. No. 259,043. The feedback mechanisms for the two toric disc structures are attached to the opposite ends of a feedback arm 150 to which the individual feedback members 166 provided with links 70 are mounted so that they are movable in unison through the feedback arm 214 which is connected to the mechanism for operating the hydraulic operating valve 212. As shown in FIG. 2 this mechanism consists of a rod 162 which is linked to the control valve 212 and pivotally supported on the rod 162 so that control movement of the arm 214 at its control valve end is corrected by the feedback structure after execution of the ratio change.

Figure 3:
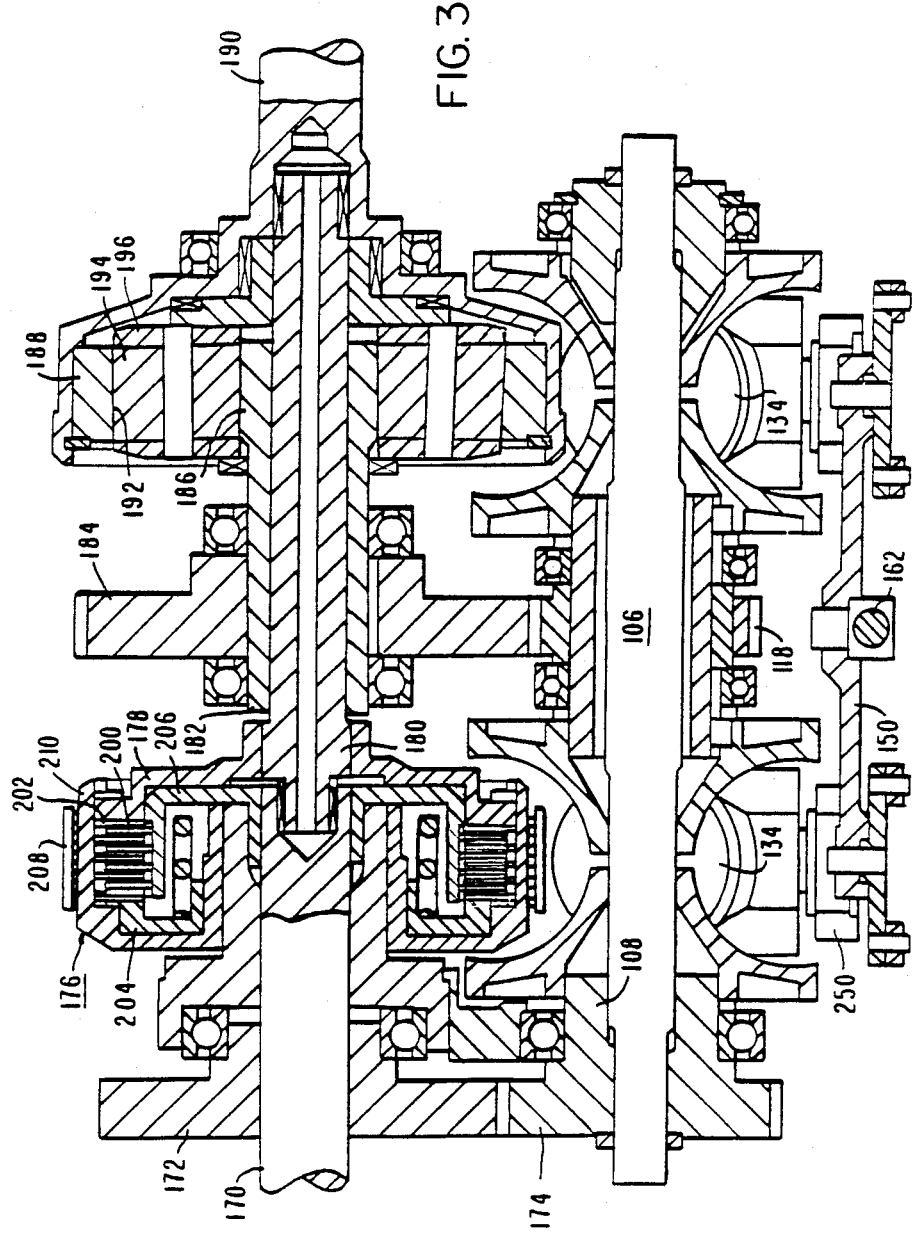
FIG. 3 is a cross-sectional view taken along line III—III of FIG. 1.

FIG. 3 is a cross-sectional view along line III—III of FIG. 1 which cross-sectional view gives a full view of the transmission mechanism. The figure does not show the housing since it is not needed for an understanding. FIG. 3 shows the transmission input shaft 170 which at its outer end carries an input gear 172 which is in engagement with the gear structure 174 on the sleeve 108 of FIG. 2. At its inner end the input shaft 170 is provided with a clutching structure 176 which includes a clutch bell 178 mounted on one end of an intermediate shaft 180 which extends through a hollow transmission shaft 182. The hollow transmission shaft 182 carries a gear 184 which is in engagement with the gear 118 mounted on the hollow traction roller transmission shaft 116 and which is driven thereby at a relative speed, variable depending on the ratio setting of pivotal traction rollers 134. The hollow transmission shaft 182 is provided at its end with a sun roller structure 186 which forms the center roller of a planetary type traction roller transmission of the type disclosed in applicant's patent application Ser. No. 07/188,132 now U.S. Pat. No. 4,846,008.

The planetary type traction roller transmission includes a traction ring 188 which is mounted for rotation with the transmission output shaft 190 and has a race 192 spaced from the surface of the sun roller 186 with planetary rollers 194 being disposed in the annular space between the traction ring 188 and the sun roller 186. The planetary rollers 194 are suppoted by a carrier 196 which is firmly mounted on the other end of the intermediate shaft 180. The planetary roller carrier 196 is either rotated together with the input shaft 170 (forward) or it is held non-rotatable (for reverse) under the control of the clutch structure 176. If the clutch plates 200 and 202 are engaged by the hydraulic piston 204, the intermediate transmmission shaft 180 is operatively connected to the clutch plate support member 206 which is mounted on the input shaft 170 so that the intermediate shaft 180 and the planetary traction roller carrier rotate with the input shaft for forward rotation of the output shaft 190. If however the clutch plates 200 and 202 are disengaged and the reverse brake band 208 engages the carrier 210 for the clutch plates 202, which carrier is connected with the clutch bell 178, the intermediate shaft 180 is locked and so is the planetary traction roller carrier 196 which then provides for reverse rotation of the ring 188 and the output shaft 190.

As shown in FIG. 3 the clutch structure 176 extends into the otherwise unused toric space defined between the toric discs of one set of toric transmission discs and the planetary traction roller ring 188 extends into the toric space defined between the toric discs of the other set of toric transmission discs so that the distance between the two sets of shafts and also the transmission volume are only relatively small.

In order to hydraulically perform tilting movement of the traction roller support trunnions the trunnion control ends 250 which are pivotally and slidably supported. are connected to operating pistons 260 disposed in operating cylinders 264 by means of a connecting rod 261 which extends through the cylinder housing 264. The piston 260 is mounted to the connecting rod 261 by a bolt 263 which has a shank of the same diameter as the connecting rod 261 and which extends through an opening in the cylinder cover 258 so as to provide for the cylinder chambers 256 and 262 at opposite sides of the piston 260 the same cross-sectional area. The cylinder chambers 256 and 262 are in communication with the appropriate parts of the control valve 212 as shown in FIG. 4.

The cover 258 is held in position by a retaining ring 259 and all seal surface areas include simple Oring seal structures which fully satisfy the sealing requirements since pressurized fluid of only relatively low pressure is utilized for the arrangement according to the invention.

Figure 4:
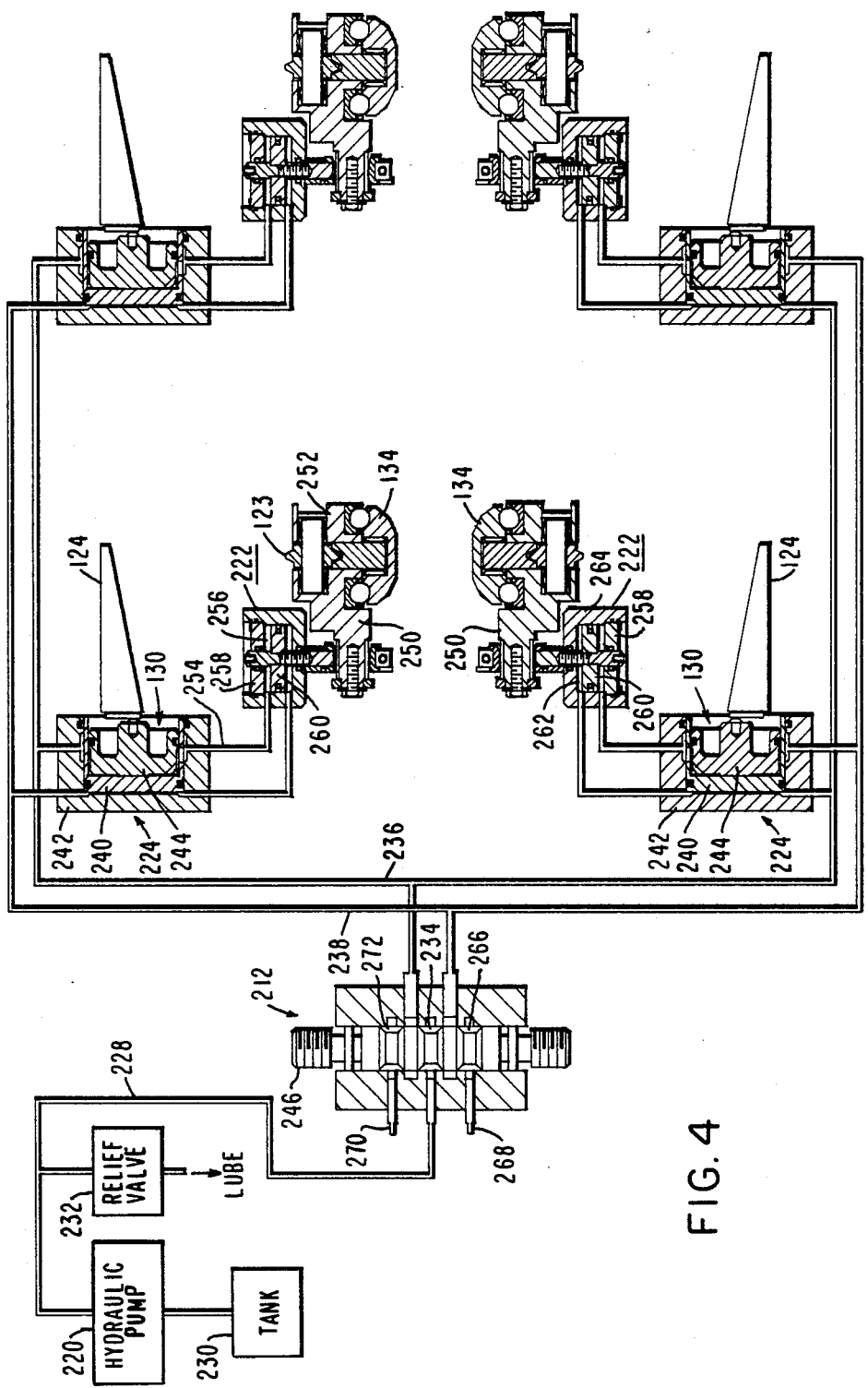
FIG. 4 shows the hydraulic control arrangement and schematically the transmission to indicate how the hydraulic control and the transimssion components cooperate.

As shown in FIG. 4 the hydraulic control arrangement consists of a pump 220 which supplies pressurized hydraulic fluid for the transmission ratio control structure 222 and for the hydraulic engagement load providing structure 224 of the traction rollers 134 under the control of a four-way servo valve 212 disposed in the hydraulic fluid supply line 228.

The hydraulic pump 220 is a relatively low pressure pump whose suction line is connected to a tank 230 and whose discharge line 228, which is provided with a relief valve 232, is connected to the supply cavity 234 of the four-way servo spool valve 212 from which the pressurized fluid may be supplied either to the first control line 236 or to the second control line 238 depending on the direction of the torque transmitted through the transmission.

The traction roller load providing structures 224 include the load wedges 124 shown also in FIG. 1 and the piston structures 130 which as shown in FIG. 4 each include an outer piston 240 disposed in a cylinder 242 and an inner piston 244 disposed within the outer piston 240. Selectively different sizes of pistons at opposite traction roller supports are necessary if the fluid pressure is the same since the reaction forces created at the traction rollers by their transmission of torque either augment the traction roller engagement forces or detract therefrom depending on the direction in which torque is transmitted through the transmission.

If in FIG. 4 the spool 246 of the spool valve 212 is, for example, moved upwardly by the lever 214 (FIG. 2), a communication path is opened to the first control line 236 through which pressurized fluid is supplied to the cylinder space within the piston 240 of the upper load providing structure 224 thereby applying a force to the upper inner piston 244 and the upper load wedge 124 which corresponds to the pressure of the fluid and the cross-section of piston 244 whereas in the lower load providing structure hydraulic fluid is supplied to the cylinder 242 thereby applying a force to the lower load wedge 124 which corresponds to the pressure of the fluid and the cross-section of piston 240 which is larger than that of piston 244. The contact force provided by the lower load wedge is therefore greater than the one provided by the upper load wedge.

Nevertheless, the hydraulic forces applied to the control ends 250 of the traction roller carriers 252 are the same at opposite rollers as, in the upper arrangement. the pressurized fluid is directed through connecting line 254 to the cylinder chamber 256 between the cylinder cover 258 and the piston 260 of the upper ratio control structure 222 whereas in the lower ratio control structure 222 the hydraulic fluid is directed to the chamber 262 between the piston 260 and the cylinder 264.

For the example given, that is, when the spool 246 is moved upwardly, the control line 238 is in communication through the relief chamber 266 of the valve 212 with a drain line 268 for releasing fluid from the cylinder 242 of the upper load providing structure 224 and with the chamber between the inner and outer pistons 244 and 240 of the lower load providing structure to release pressurized fuid therefrom. If the transmission ratio is to be changed in the opposite manner, that is, if the valve spool 246 is moved downwardly, then pressurized fluid is supplied to control line 238 and control line 236 is placed in communication with drain line 270 through relief chamber 272 so that conditions are reversed. In any case the control ends 250 of the traction roller support structures 252 are either both biased downwardly as shown in FIG. 4 or both upwardly for corresponding changes in the transmission ratio.

When the desired ratio change order is executed, the feedback structure lever mechanism automatically returns the valve spool essentially to the neutral position, providing however sufficient pressure to maintain the respective transmission ratio and the traction roller engagement load forces.

The control arrangement as shown requires only low pressure fluid and therefore is sufficiently inexpensive and reliable that it can be utilized for the ratio and traction control of relatively inexpensive transmissions for use for example in connection with motor vehicles.

What is claimed is:

1. A hydraulic control arrangement for an infinitely variable traction roller transmission comprising: a housing; two toric traction discs rotatably supported in said housing, one for rotation with an input shaft and the other for rotation with an output shaft, said toric discs having opposite traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported in said housing by a pivot trunnion, each of said pivot trunnions having a support roller mounted thereon and a partial circular track structure arranged adjacent each pivot trunnion and supporting the support roller thereof, said track structures having hydraulic means associated therewith so as to be adapted to force the traction rollers on said pivot trunnions into force transmitting engagement with said toric discs, each of said trunnions having a control end and being pivotally supported in said housing so as to be also movable slightly in a plane normal to the axis of said toric discs; hydraulic control means for controllably tilting said trunnions in unison in the same angular sense with respect to the axis of the toric discs so as to provide for precess motion of said traction rollers for initiation of a transmission ratio change; and a feedback structure associated with said trunnions and said hydraulic control means for terminating ratio changing tilting of said trunnions when a desired transmission ratio has been executed.

2. A traction roller transmission according to claim 1, wherein said feedback structure includes arms mounted on said trunnion ends so as to project in directions essentially normal to a plane receiving the pivot axis of said trunnions and the axis of the associated traction roller and means connected to said arms so as to be moved by the tilting of said trunnions.

3. A traction roller transmission according to claim 2, wherein two traction rollers are arranged opposite one another with respect to the transmission axis and their trunnion ends are projecting in the same direction and said arms project from said trunnion ends in parallel fashion in opposite directions and wherein said means connected to said arms are links connected to a common feedback member, said feedback member being connected to an operating mechanism for setting the transmission ratio.

4. A traction roller transmission according to claim 3, wherein said hydraulic control means for pivoting said trunnions include hydraulic operating cylinders and piston operatively connected to said trunnion ends for tilting said trunnions, a hydraulic control valve for controlling admission of hydraulic fluid to said hydraulic cylinder and piston arrangements for initiating a transmission ratio change and a control valve for supplying pressurized fluid to said cylinder and piston arrangements, said control valve having an operating memchanism connected to said feedback structure for counteracting control movement of said operating mechanism upon pivot movement of said trunnions to a desired transmission ratio.

5. A traction roller transmission according to claim 4, wherein said track structure adjacent each pivot trunnion is supported on a wedge and a hydraulic and load providing structure is provided adjacent each wedge for forcing said wedges into wedge spaces adjacent said pivot trunnions for forcing the traction rollers on said pivot trunnions into firm engagement with the associated toric discs.

6. A traction roller transmission according to claim 5, wherein said hydraulic load providing structures each include in a cylinder an outer piston providing a first cylinder chamber of a predetermined cross-section and an inner piston within said outer piston providing for a second cylinder chamber of a cross-section smaller than that of said first cylinder chamber, and wherein the first cylinder chamber of the hydraulic load providing structure at one side of the transmission axis and the second cylinder chamber of the hydraulic load providing structure at the opposite side of the transmission axis are commonly in communication with said control valve for supplying pressurized fluid thereto during the transmission of torque in one sense while the second cylinder chamber of the hydraulic load providing structure at said one side of the transmission axis and the first cylinder chamber of the hydraulic load providing structure at said opposite side of the transmission axis are commonly in communication with said control valve for supplying pressurized fluid thereto during the transmission of torque in the opposite sense.

7. A traction roller transmission according to claim 6, wherein said hydraulic control means for pivoting said trunnions include operating pistons operatively connected to said trunnion control ends and disposed in cylinders arranged adjacent to said trunnion control ends, said cylinders having fluid chambers arranged at opposite sides of said operating pistons with the fluid chamber at one side of each operating piston being in communication with the first cylinder chamber and the fluid chamber at the opposite side of each operating piston being in communication with the second cylinder chamber of the respective hydraulic load providing structure.

* * * * *